Dec. 24, 1935.  K. J. TOBIN ET AL  2,025,221
CAR DOOR CONSTRUCTION
Filed Jan. 3, 1933  3 Sheets-Sheet 3
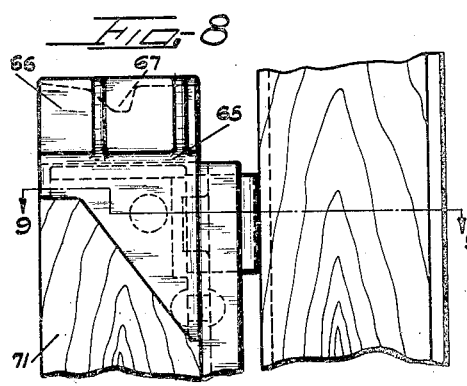
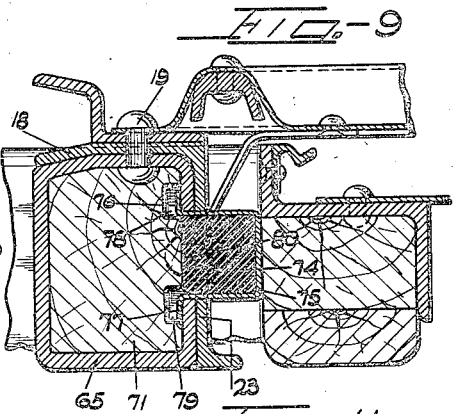
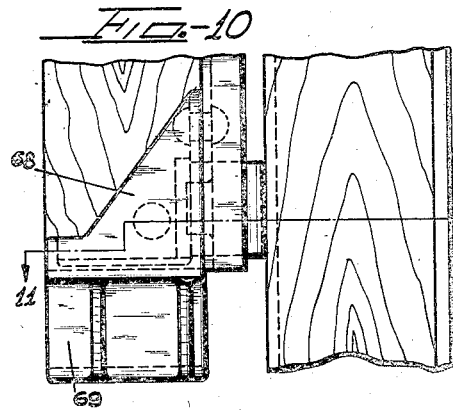
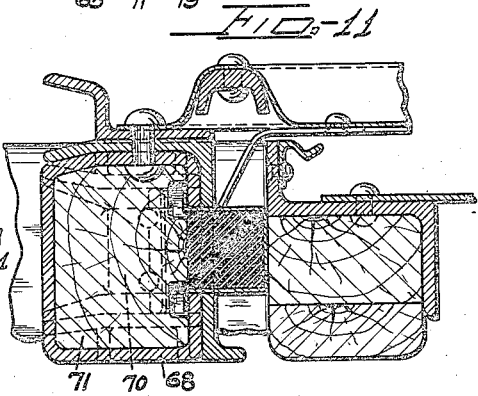
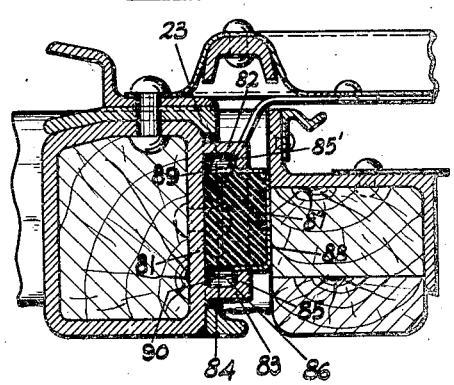
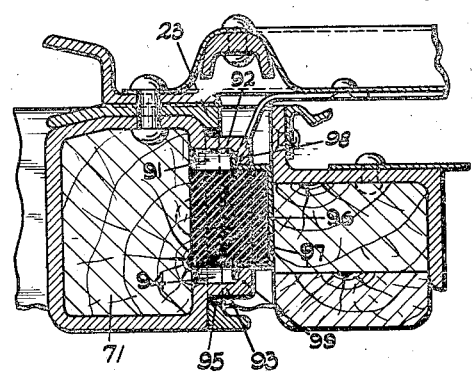
~INVENTORS~
KENNETH J. TOBIN
FREDERICK C. HEINEN
By~ Samuel Reese
ATTY.

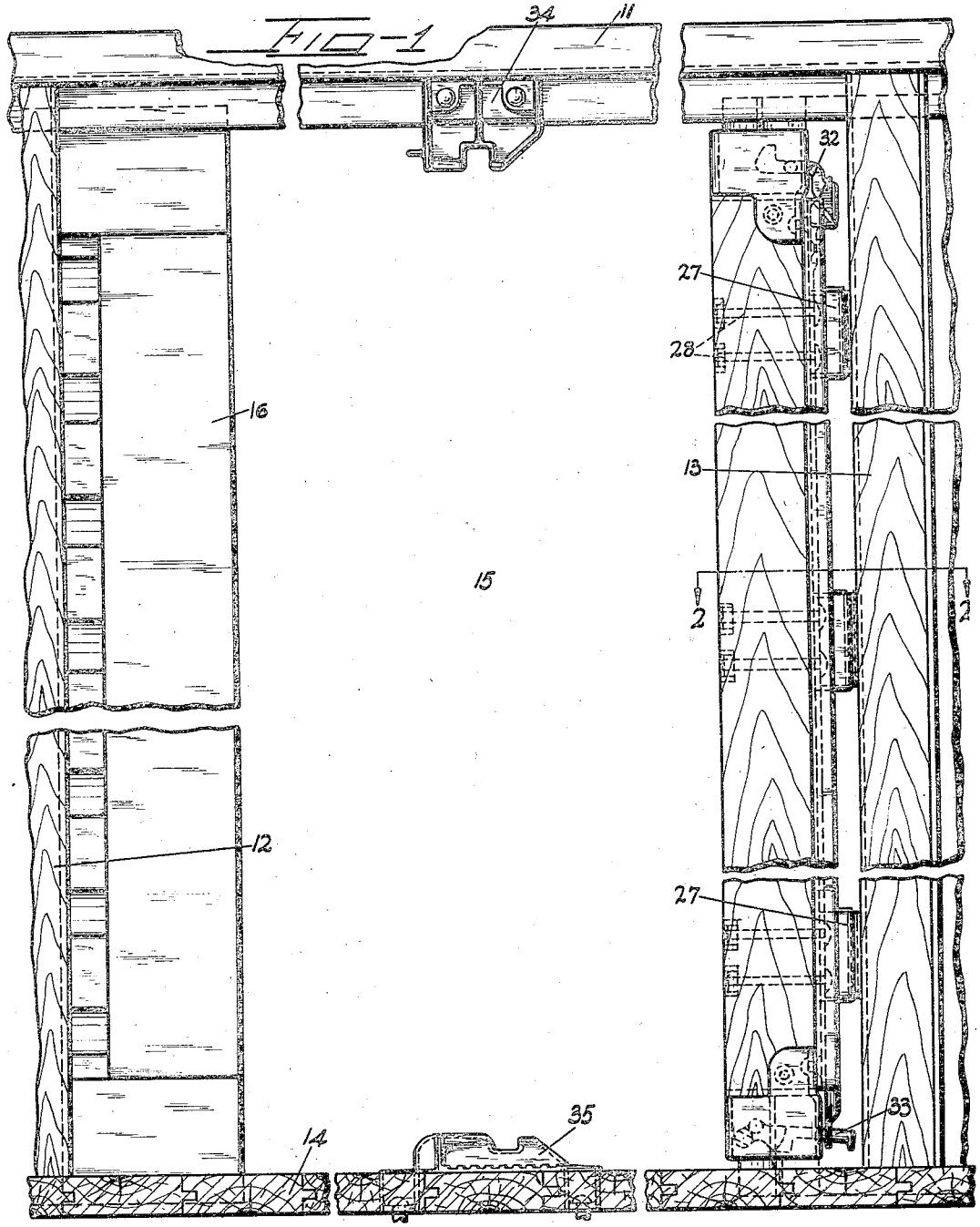

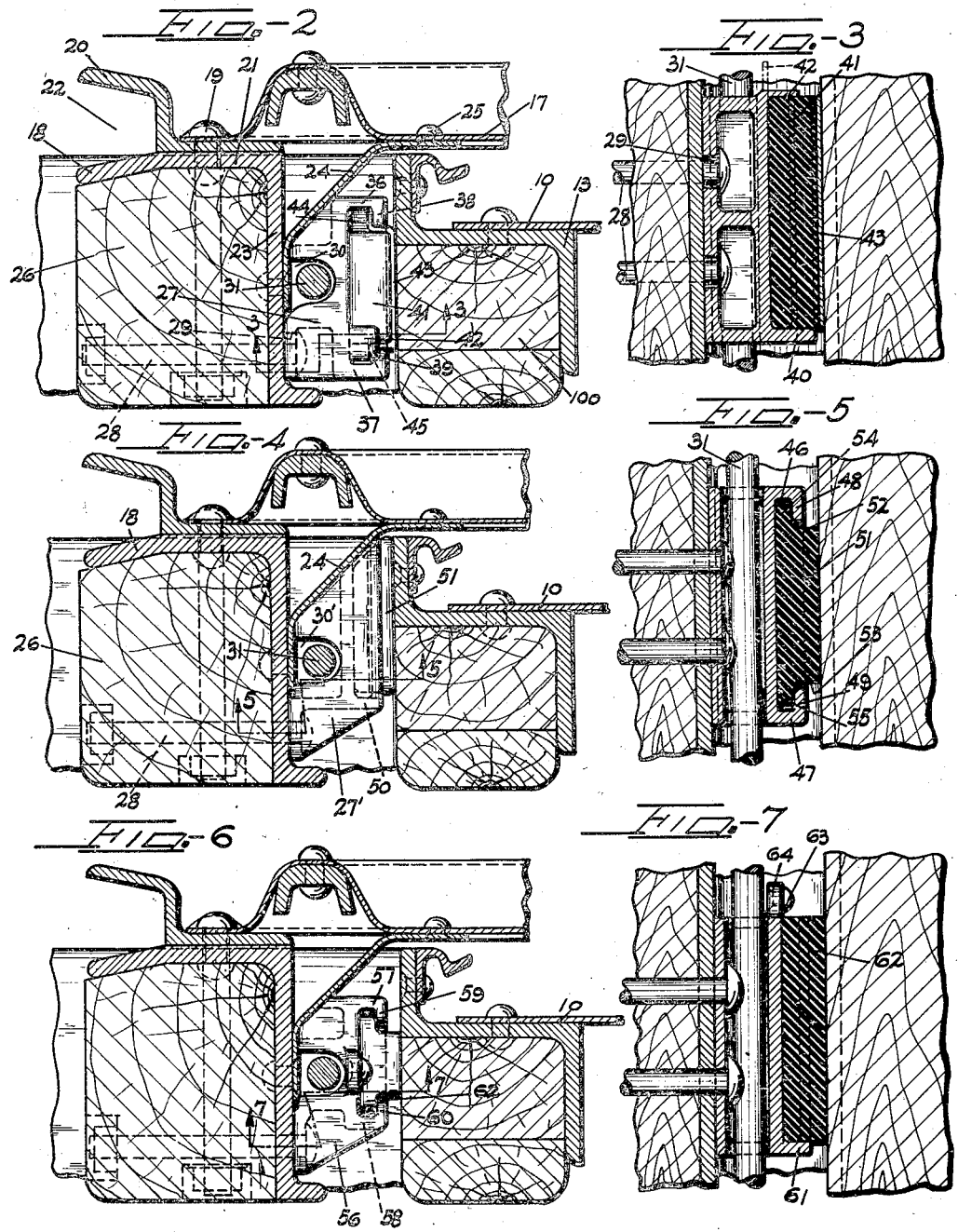

Patented Dec. 24, 1935

2,025,221

UNITED STATES PATENT OFFICE 2,025,221

CAR DOOR CONSTRUCTION

Kenneth J. Tobin and Frederick C. Heinen, Chicago, Ill., assignors, by mesne assignments, to The Youngstown Steel Door Company, Cleveland, Ohio, a corporation of Ohio Application January 3, 1933, Serial No. 649,856

10 Claims. (Cl. 189—46)

This invention relates to car door construction and is directed primarily to the construction of the auxiliary door of the double doors of the so-called automobile house cars.

It is an object of this invention to provide an auxiliary door which shall obviate the use of stops customarily employed to limit the opening movement of the door and the injury frequently occurring to the rear edge thereof.

A further object is to provide an auxiliary door capable of utilizing the door frame of the car to which the door is applied as a stop for limiting opening movement of the door.

A further object is to provide an auxiliary door having a post or jamb adjacent the forward edge thereof so constructed as to serve as an abutment to stop the opening movement of the door.

A further object is to provide an auxiliary door having a post adjacent the forward edge thereof adapted to cooperate with a stationary post provided on the car, to which the door is applied, to limit the opening movement of the door.

A further object is to provide an auxiliary door carrying resilient members adapted to abut against a part of the side of the car on which the door is mounted to limit opening movement of the door.

A further object is to provide an auxiliary door carrying a post or a jamb adjacent the forward edge thereof having means including resilient members adapted to engage a fixed post on the car to which the door is applied to limit opening movement thereof.

A further object is to provide an auxiliary door having a post secured adjacent the forward edge thereof carrying castings secured to the top and bottom of the post formed to receive resilient members adapted to strike against a fixed post provided on the car to limit opening movement of the door.

A further object is to provide an auxiliary door having a post secured adjacent the forward edge thereof which has fastened thereto a plurality of castings carrying resilient striking members, said members being retained in position in the castings by a portion of the door.

A further object is to provide an auxiliary door having a post secured adjacent the forward edge thereof carrying castings secured to the top and bottom of the post and a filler member, the castings being formed to receive resilient members adapted to strike against a fixed post provided on the car to limit opening movement of the door and the filler member being adapted to retain the resilient members in the castings.

Other objects will become clear as the description of the invention proceeds.

In the drawings forming part of this specification

Figure 1 is a partial elevation of an automobile house car showing the invention.

Figure 2 is a horizontal section taken on line 2—2 of Figure 1.

Figure 3 is a section taken on line 3—3 of Figure 2.

Figure 4 is a section corresponding to Figure 2 and illustrating a modified embodiment of the invention.

Figure 5 is a section taken on line 5—5 of Figure 4.

Figure 6 is a section corresponding to Figure 2, showing a further embodiment of the invention.

Figure 7 is a section taken on line 7—7 of Figure 6.

Figure 8 is a partial elevation showing a modified form of the invention applied to the upper portion of a different form of post or jamb.

Figure 9 is a section taken on line 9—9 of Figure 8.

Figure 10 is a fragmentary elevation showing a modified form of the invention applied to the lower portion of the jamb illustrated in Figure 8.

Figure 11 is a section taken on line 11—11 of Figure 10.

Figures 12 and 13 are sectional views showing additional modifications of the invention applied to posts of the general characteristic shown in Figures 8 and 10.

Referring, first, to the embodiment of the invention illustrated in Figures 1 to 3, inclusive, a portion of an automobile house car 10 is shown. The car 10 embodies a side plate 11 and fixed posts 12 and 13 which, together with the floor 14 of the car, define an opening 15 of extraordinary width so that automobiles and other bulky lading may readily be loaded into the car. The opening 15 is adapted to be closed by a pair of doors comprising a main door 16, shown partially in Figure 1 of the drawings, and an auxiliary door 17. The auxiliary door 17 has secured to the forward margin thereof, as shown more clearly in Figure 2 of the drawings, a post or jamb 18 secured to the door by means of a plurality of rivets 19 passing through said margin of the door and adapted to secure a substantially Z-shaped member 20 to said door and said jamb. The post 18 is preferably substantially Z-shaped in cross section having a laterally extending flange 21 which co-acts with the member 20 to provide a recess 22 adapted to receive the forward margin of the main door in the closed position of the main and auxiliary door. A flange 23 extends inwardly from the flange 21 transversely to the door and has secured thereto one end of a brace 24, the other end of which is attached to the auxiliary door as indicated at 25. This brace tends to prevent rotation of the jamb in impact. The post or jamb 18 may carry a wood filler 26 for coopering purposes.

In the prior automobile cars it is customary to utilize metallic stops secured to the car and engageable with the rear edge of the auxiliary door in the opening movement thereof to limit such movement. These stops have not proved entirely satisfactory inasmuch as they are frequently rendered ineffective for their intended purpose as a result of the impact of the doors thereon. Moreover, this impact has frequently so distorted the rear edge of the door which comes into contact with the stops as to render the door ineffective for its purpose. The instant invention obviates the use of such stops.

To this end there is secured to the flange 23 of the post or jamb 18 a plurality of members 27, preferably in the form of castings, and retained upon the post by means of the bolts 28 utilized in securing the wooden filler to the post, these bolts 28 passing through slots 29 provided in the members. Each of the members 27 is provided with a recess 30 through which the operating bar 31 for the upper and lower latches 32 and 33, respectively, extends. The latches 32 and 33 are intended for cooperation with upper and lower stops 34 and 35, respectively, in order to secure the auxiliary door in its closed position. By the provision of the openings 30 in the castings 27, said castings are adapted to serve as guide and retaining members for the operating bar 31. The castings 27 are provided with rearwardly extending spaced flanges 36 and 37 which are formed at their ends with inwardly directed flanges 38 and 39. A bottom flange 40 extends between the rearwardly directed flanges 36 and 37 and together with said flanges constitutes a pocket adapted to receive a resilient striking member 41 in the form of a rubber block. The resilient striking member 41 is inserted into the casting through the top thereof which is left open and maintained against vertical displacement by means of the flange 40 and a lug 42 preferably cast integral with the member 27 and adapted to be bent over upon the resilient member 41 as shown in Figure 3 of the drawings. The rubber block 41 is retained against lateral displacement from the casting 27 by means of a casing 43 provided with oppositely extending flanges 44 and 45 which have interlocking engagement with the inwardly directed flanges 38 and 39 provided on the member 27.

In the embodiment of the invention illustrated in Figures 4 and 5 of the drawings a member 27' preferably in the form of a casting and secured to the post or jamb 18 by means of the bolts 28 which fasten the wood filler 26 to the post is utilized in place of the member 27 hereinabove described. The member 27' is recessed as indicated at 30' so as to enable said member to serve as a guide and retaining means for the operating bar 31. In addition the member 27' is provided with a pair of vertically spaced flanges 46 and 47 which are turned inwardly to provide the retaining flanges 48 and 49. These flanges, together with the backing wall 50, provide a pocket adapted to receive a rubber striking block 51, which is rabbeted as indicated at 52 and 53 to provide shoulders 54 and 55 adapted to have interlocking engagement with the flanges 48 and 49. As clearly illustrated in Figure 4 of the drawings, the member 27' is tapered so as to conform to and abut the brace 24. By this arrangement it is apparent that the brace will prevent displacement of the rubber from its position in the member 27'.

A somewhat different form of casting, utilizing a rubber striking member, is illustrated in Figures 6 and 7 of the drawings. This casting 56 is provided with horizontally spaced flanges 57 and 58, from which inwardly directed flanges 59 and 60 extend. These flanges, together with the wall 61, form a pocket for the reception of the shouldered resilient striking member 62 and vertical displacement of the striking member from the casting is prevented by means of the rivet 63 carried by a flange 64 provided on the casting 56.

Each of the forms of the invention hereinabove described is shown in its application to a post or jamb of an auxiliary door of the straight sliding construction. The jamb in this construction carries latches as illustrated at 32 and 33 and the common operating bar 31. Lift doors are also utilized for automobile house cars and in this type of door the post or jamb secured to the auxiliary door is constructed so as to incorporate its latching device. Jambs which are self-latching may also be utilized upon auxiliary doors of the straight sliding type in which event said jambs are positioned upon the auxiliary doors so as to be capable of vertical movement relative thereto.

The instant invention is applicable to jambs of the type hereinabove described. As illustrated in Figures 8 to 11, inclusive, the post or jamb 18 comprises the substantially Z-shaped member 18 secured to the forward margin of the door by means of the rivets 19. A cap member 65 is secured to the upper portion of the member 18 and extends upwardly therefrom. The upwardly extending portion of the cap member 65 embodies a plurality of horizontally spaced identical walls 66 carrying projections 67 constituting detent members and adapted for engagement with abutment members carried by the car so as to latch the upper portion of the auxiliary door in the closed position thereof. Similarly, there is secured to the bottom of the Z-shaped member 18 a seat member 68 provided with horizontally spaced identical walls 69 extending below the Z-shaped member 18. The seat member 68 is provided with a downwardly directed projection 70 which is adapted to engage an abutment member provided on the car below the Z-shaped member 18 in order to secure the bottom portion of the auxiliary door in closed position. It may be considered that the Z-shaped member 18, together with the cap and seat members secured thereto, constitute the post or jamb for an auxiliary door of the lift type or a post or jamb for an auxiliary door of the straight sliding type in which the post or jamb has vertical movement relative to the door. The constructions of the post seat and post cap are briefly referred to herein inasmuch as their constructions constitute no particular part of the invention except in the combination set out in the claims and in view of the fact that more detailed description thereof may be had by reference to Patent #1,870,268, dated August 9, 1932. The post illustrated in Figures 8 to 11, inclusive, is adapted to carry a wood filler member 71, the upper end of which extends into the post cap and the lower end of which extends into the post seat.

The post construction above described is adapted to carry resilient striking members for cooperation with the fixed post 13 so as to eliminate the necessity for the back stops usually secured upon the outside of the car and engaging the rear edge of the auxiliary door to serve as stops therefor. With reference to Figure 9 of the drawings, it will be apparent that the post cap 65 and the inwardly directed transverse flange 23 of the substantially Z-shaped member 18 are provided with aligned openings 72 and 73. A resilient striking member 74, preferably in the form of a rubber block, is adapted to be seated in said aligned openings and to be retained therein by means of a casing member 75 which extends through said openings and is provided with oppositely directed flanges 76 and 77 having interlocking engagement with the member 65. This interlocking engagement is permitted by providing the wood filler member 71 with rabbeted portions 78 and 79. The portion 80 of the wood filler member intermediate the rabbeted portions serves as a backing means for the rubber block 74. Reference to Figure 11 discloses the fact that the construction above described with relation to the post cap member 65 is substantially the same for the post seat member 68 and further reference thereto is, consequently, not necessary.

A modified form of the invention illustrated in Figures 8 to 11, inclusive, is illustrated in Figure 12 of the drawings. In this modification the wall 81 of the post cap or post seat remains intact and said wall is provided with horizontally spaced rearwardly extending flanges 82 and 83 extending through an opening 84 provided in the flange 23. The flanges 82 and 83 are provided with the inwardly directed flanges 85 and 85' so as to form, with the bottom wall 86, a pocket adapted to receive the resilient cushioning means 87 which is retained in position by means of the casing 88. This casing is interlocked with the inwardly directed flanges 84 and 85 as indicated at 89 and 90.

A further embodiment of the invention, which also utilizes the filler member 71 as a backing member, but which avoids the necessity of rabbeting said filler member, is illustrated in Figure 13 of the drawings. In this modification the post cap or post seat is formed with a recess 91 provided by the horizontally spaced flanges 92 and 93 and the wall 94. The flanges 92 and 93 extend through an opening 95 formed in the flange 23 of the substantially Z-shaped member 18. By this construction the wood filler 71 is exposed so as to form a backing member for the resilient cushioning means 96 which is seated in the recess 91 and retained therein by means of the interlocking engagement between the casing 97 and the inwardly directed flanges 98 and 99.

It will be evident that the objects of the invention are obtained in each of the embodiments thereof hereinbefore described. The figures of the drawings illustrate the auxiliary door in its full open position and in such position the engagement between the resilient striking means and the fixed post 13 or the filler 100 thereof is obtained.

It is apparent that with these constructions the need for the usual back stops is eliminated.

It is apparent that numerous changes and modifications in the details of the invention will be clear to those skilled in the art. It is intended, therefore, that all such changes and modifications be comprehended within this invention, which is to be limited only by the scope of the claims appended hereto.

We claim:

1. In a railway house car having a door opening in a side thereof and a stationary door post contiguous to said opening, a plurality of doors adapted to close said opening, said doors including an auxiliary sliding door, a post secured to the forward margin of said auxiliary door and movable with said door, a portion of said movable post extending inwardly transversely of said auxiliary door, resilient striking means carried by said transversely extending portion, said striking means adapted to engage said stationary door post in the opening movement of said door to limit said movement.

2. In a railway house car having a door opening in a side thereof and a stationary door post contiguous to said opening, a plurality of doors adapted to close said opening, said doors including an auxiliary sliding door, resilient striking means secured to said auxiliary door adjacent the forward vertical edge thereof so as to move with said door, said striking means being disposed in alignment with said stationary door post whereby, in the opening movement of said auxiliary door, said striking means will engage said stationary door post to limit said movement.

3. In a railway house car having a door opening in a side thereof and a stationary door post contiguous to said opening, a plurality of doors adapted to close said opening, said doors including an auxiliary sliding door, a post secured to the forward margin of said auxiliary door and movable with said door, said movable post having a vertically disposed flange extending inwardly transversely of said auxiliary door and resilient striking means secured to said flange and extending in the direction of said stationary door post for the purpose set forth.

4. In a railway house car having a door opening in a side thereof and a stationary door post contiguous to said opening, a plurality of doors adapted to close said opening, said doors including an auxiliary sliding door, a post secured to the forward margin of said auxiliary door and movable with said door, a portion of said movable post extending inwardly transversely of said auxiliary door, resilient striking means, carrying members for said striking means secured to said transversely extending portion, said striking means being insertable into said members through a side thereof, said members being disposed with said side in engagement with the auxiliary door to prevent loss of said resilient means, said striking means adapted to engage said stationary door post in the opening movement of said door to limit said movement.

5. In a railway house car having a door opening in a side thereof and a stationary door post contiguous to said opening, a plurality of doors adapted to close said opening, said doors including an auxiliary sliding door, a post secured to the forward margin of said auxiliary door and movable with said door, a portion of said movable post extending inwardly transversely of said auxiliary door, latch mechanism for said auxiliary door carried by said post, including a vertical operating bar positioned adjacent said portion and between said portion and said stationary door post, combined guide and retaining members for said operating bar secured to said portion of said movable post and resilient striking means carried by said members and extending in the direction of said stationary post for the purpose set forth.

6. In a railway house car having a door opening and a stationary door post contiguous to said opening, a plurality of doors including a slidable auxiliary door for closing said opening, said auxiliary door having an inwardly and transversely extending post secured to the forward margin thereof and movable with said auxiliary door, a cap member and a seat member secured to said movable post, resilient striking means carried by said members, said striking means engaging said stationary door post in the opening movement of said auxiliary door to limit said movement.

7. In a railway house car having a door opening and a stationary door post contiguous to said opening, a plurality of doors including a slidable auxiliary door for closing said opening, said auxiliary door having an inwardly and transversely extending post secured to the forward margin thereof and movable with said auxiliary door, resilient striking means secured to one of said posts, said striking means engaging said other post in the opening movement of said door to limit said movement.

8. In a railway house car having a door opening and a stationary door post contiguous to said opening, a plurality of doors including a slidable auxiliary door for closing said opening, said auxiliary door having an inwardly and transversely extending post secured to the forward margin thereof and movable with said auxiliary door, a wooden filler member secured to said movable post and disposed relative thereto in the direction of closing movement of said door, resilient striking means carried by said movable post disposed in the direction of opening movement of said door and adapted to engage said stationary post in the opening movement of the door to limit said movement, said striking means having abutting engagement with said filler member.

9. In a double door construction for a railway house car having a door opening and a stationary door post contiguous to said opening comprising a main door and a slidable auxiliary door for closing said opening, a post secured to the forward margin of said auxiliary door for movement therewith, said post having a flange extending inwardly transversely of said door in alignment with said stationary post, a post cap and a post seat secured, respectively, to the upper and lower ends of said movable post in overlapping relationship with said transversely extending flange of said movable post, a wooden filler member secured to one side of said movable post flange and projecting into said post seat and post cap, openings provided in said movable post flange, post seat and post cap, resilient striking means positioned in said openings in abutment with said filler and extending from the opposite side of said flange and means engaging said striking means having interlocking engagement with said post seat and post cap for maintaining said striking means in position, said striking means engaging said stationary post in the opening movement of said auxiliary door to limit said movement.

10. In a double door construction for a railway house car having a door opening and a stationary door post contiguous to said opening comprising a main door and a slidable auxiliary door for closing said opening, a post secured to the forward margin of said auxiliary door for movement therewith, said post having a flange extending inwardly transversely of said door in alignment with said stationary post, a post cap and a post seat secured respectively to the upper and lower ends of said movable post in overlapping relationship with said transversely extending flange of said movable post, said post seat and post cap having flanges extending therefrom directed toward said stationary post through openings provided in said movable post flange and forming pockets, resilient striking means disposed in said pockets and means for retaining said striking means in said pockets, said striking means engaging said stationary post in the opening movement of said auxiliary door to limit said movement.

KENNETH J. TOBIN.
FREDERICK C. HEINEN.